UNITED STATES PATENT OFFICE.

AUGUST PFAFF, OF FREIBERG, GERMANY.

HIGHLY-REFRACTORY MATERIAL AND PROCESS FOR MAKING IT.

1,159,264.  Specification of Letters Patent.  Patented Nov. 2, 1915.

No Drawing.  Application filed March 24, 1915. Serial No. 16,820.

*To all whom it may concern:*

Be it known that I, Dr. AUGUST PFAFF, subject of the King of Prussia, residing at 24 Frauensteinerstrasse, Freiberg, in Saxony, Germany, have invented certain new and useful Improvements in Highly-Refractory Material and Process for Making It, of which the following is a specification.

My invention relates to a new highly refractory material and to the process for making it. The material consists of a mixture of zirconia and silicon-carbid or carborundum, this mixture preferably containing about equal parts of the constituents dressed according to any of the well known methods, thereafter formed and then burnt at a high temperature.

I am aware that it is old to make highly refractory vessels from zirconia, and that it is equally old to employ carborundum in the preparation of surfaces designed to be subjected to high temperatures. Vessels made from zirconia have proved to be of little value, as zirconia will, especially if employed in apparatus subjected to frequent variations in temperature, become cracked and brittle and will loose its mechanical coherence. On the other hand vessels consisting of carborundum show the disadvantage of not resisting the oxidizing influence of the air at high temperatures, the carbon gradually burning out and the melting point of the vessels being thereby lowered to the melting point of silica.

In contradistinction to these materials the articles made of a mixture of carborundum and zirconia have an absolute tough and homogeneous body of great density, a reaction between zirconia and carborundum apparently taking place during the burning. This presumption is corroborated by the fact that these vessels on being burnt show a considerable shrinkage. The vessels made according to the present invention will be covered during the burning and more so during use with a more or less glazing-like layer, and this layer or coating seems to protect the interior of the body against oxidation. All kinds of articles can be manufactured from the mixture aforesaid. It is equally adapted for the manufacture of muffles for ceramic purposes, of crucibles, for the lining of metallurgical furnaces and so on.

The constituents of the mixture are preferably employed in about equal parts. If it is desired to obtain the maximum of refractoriness, the silicon-carbid should be employed in the form of a powder coarser in grain than the zirconia.

The highly refractory qualities of the new material make it adapted also for the manufacture of electric resistances for use in such cases where it is imperative that the resistances shall be efficacious also at high temperatures.

The zirconia proper may also be replaced by the oxids of zirconium found in the trade; further additions may be made to the mass provided that they do not depress the melting point.

I claim:

1. The process for making highly refractory articles which consists in mixing zirconia and carborundum, bringing the mixture into shape and burning the shaped article.

2. The process for making highly refractory articles which consists in mixing zirconia and carborundum, the particles of carborundum being coarser than those of the zirconia, bringing the mixture into shape and burning the shaped article.

3. As a new article of manufacture, a highly refractory material consisting of a burnt mixture of zirconia and carborundum.

4. As a new article of manufacture, a highly refractory material consisting of a burnt mixture of about equal parts of zirconia and carborundum.

5. As a new article of manufacture, a highly refractory material consisting of a mixture of zirconia and carborundum, the carborundum being coarser in grain than the zirconia.

6. As a new article of manufacture, a highly refractory vessel consisting of a burnt mixture of zirconia and carborundum.

7. As a new article of manufacture, a highly refractory article consisting of a burnt mixture of zirconia and carborundum.

In testimony whereof I affix my signature in presence of two witnesses.

DR. AUGUST PFAFF.

Witnesses:
WERNER HOFMANN,
BERTOLD A. BRAUN.